US011222192B2

(12) United States Patent
Tang et al.

(10) Patent No.: US 11,222,192 B2
(45) Date of Patent: Jan. 11, 2022

(54) ULTRASONIC FINGERPRINT RECOGNITION MODULE, FABRICATING METHOD THEREOF, AND DISPLAY DEVICE

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Guoqiang Tang, Beijing (CN); Yingsong Xu, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 298 days.

(21) Appl. No.: 16/492,347

(22) PCT Filed: Jan. 17, 2019

(86) PCT No.: PCT/CN2019/072092

§ 371 (c)(1),
(2) Date: Sep. 9, 2019

(87) PCT Pub. No.: WO2019/223349

PCT Pub. Date: Nov. 28, 2019

(65) Prior Publication Data

US 2021/0334493 A1 Oct. 28, 2021

(30) Foreign Application Priority Data

May 24, 2018 (CN) ........................ 201810508421.3

(51) Int. Cl.
*G06K 9/00* (2006.01)
*B06B 1/06* (2006.01)

(52) U.S. Cl.
CPC .......... *G06K 9/0002* (2013.01); *B06B 1/0692* (2013.01); *B06B 2201/70* (2013.01)

(58) Field of Classification Search
None
See application file for complete search history.

(56) References Cited

U.S. PATENT DOCUMENTS 10,008,659 B2 6/2018 Park et al.
2011/0279662 A1 11/2011 Schneider et al.
(Continued)

FOREIGN PATENT DOCUMENTS

CN 205281517 U 6/2016
CN 107107114 A 8/2017
CN 108446685 A 8/2018

*Primary Examiner* — Nicholas J Lee
(74) *Attorney, Agent, or Firm* — Nath, Goldberg & Meyer; Joshua B. Goldberg

(57) ABSTRACT

This application provides an ultrasonic fingerprint recognition module including: a base substrate; at least one ultrasonic wave signal receiver and at least one ultrasonic wave signal transmitter on the base substrate, which are on a same side of the base substrate and spaced apart from each other in a first direction parallel to the base substrate; a piezoelectric sensing layer on a side of the at least one ultrasonic wave signal transmitter and the at least one ultrasonic wave signal receiver distal to the base substrate; and an electrode layer on a side of the piezoelectric sensing layer distal to the base substrate.

19 Claims, 4 Drawing Sheets

(56) References Cited

U.S. PATENT DOCUMENTS

| | | | |
|---|---|---|---|
| 2016/0131747 | A1 | 5/2016 | Tang et al. |
| 2017/0090028 | A1* | 3/2017 | Djordjev ............. G01S 7/52079 |

* cited by examiner

ULTRASONIC FINGERPRINT RECOGNITION MODULE, FABRICATING METHOD THEREOF, AND DISPLAY DEVICE

CROSS-REFERENCE TO RELATED APPLICATIONS

This is a National Phase Application filed under 35 U.S.C. 371 as a national stage of PCT/CN2019/072092, filed on Jan. 17, 2019, an application claiming the priority of Chinese Patent Application No. 201810508421.3, filed on May 24, 2018, the contents of which are incorporated herein in their entirety by reference.

TECHNICAL FIELD

The present disclosure relates to the field of ultrasonic fingerprint recognition technology, and particularly to an ultrasonic fingerprint recognition module, a fabricating method thereof, and a display device.

BACKGROUND

Compared with capacitive touch screen-based fingerprint technology, ultrasonic fingerprint technology has many unique advantages, such as the ability of passing through a smartphone case made of glass or plastic to perform scanning which is not affected by contaminant such as sweat, hand cream or condensation that may be present on fingers. Thus, a more stable and accurate fingerprint recognition method is provided by the ultrasonic fingerprint technology.

SUMMARY

In one aspect, the present disclosure provides an ultrasonic fingerprint recognition module, including:

a base substrate;

at least one ultrasonic wave signal receiver and at least one ultrasonic wave signal transmitter on the base substrate, wherein the at least one ultrasonic wave signal transmitter and the at least one ultrasonic wave signal receiver are on a same side of the base substrate and spaced apart from each other in a first direction parallel to the base substrate;

a piezoelectric sensing layer on a side of the at least one ultrasonic wave signal transmitter and the at least one ultrasonic wave signal receiver distal to the base substrate; and an electrode layer on a side of the piezoelectric sensing layer distal to the base substrate.

According to some embodiments of the present disclosure, the piezoelectric sensing layer includes a first portion having a first thickness and a second portion having a second thickness, the first thickness is greater than the second thickness, an orthographic projection of the ultrasonic wave signal transmitter on the base substrate at least partially overlaps an orthographic projection of the first portion on the base substrate, and an orthographic projection of the ultrasonic wave signal receiver on the base substrate at least partially overlaps an orthographic projection of the second portion on the base substrate.

According to some embodiments of the present disclosure, the ultrasonic wave signal receiver includes a plurality of ultrasonic wave signal receiving blocks arranged in a second direction parallel to the base substrate and spaced apart from each other, and the first direction intersects with the second direction.

According to some embodiments of the present disclosure, the ultrasonic wave signal transmitter includes an ultrasonic wave signal transmitting block extending in the second direction and having an elongated shape.

According to some embodiments of the present disclosure, the ultrasonic wave signal transmitter includes a plurality of ultrasonic wave signal transmitting blocks arranged in the second direction and spaced apart from each other.

According to some embodiments of the present disclosure, an insulating layer is between the ultrasonic wave signal transmitter and the ultrasonic wave signal receiver.

According to some embodiments of the present disclosure, the ultrasonic wave signal transmitter includes a transmitting electrode and is configured to apply a voltage provided by an external circuit to the transmitting electrode such that the piezoelectric sensing layer is excited by a voltage between the transmitting electrode and the electrode layer to generate ultrasonic waves; and the ultrasonic wave signal receiver includes a receiving electrode configured to receive an electrical signal into which reflected ultrasonic waves are converted by the piezoelectric sensing layer, and the ultrasonic wave signal receiver is configured to transmit the electrical signal received by the receiving electrode to the external circuit for sensing.

According to some embodiments of the present disclosure, a cross section of the ultrasonic wave signal receiving block parallel to the base substrate has a shape of rectangle with a length of side ranging from 40 um to 60 um.

According to some embodiments of the present disclosure, a cross section of the ultrasonic wave signal transmitting block parallel to the base substrate has a shape of rectangle with a length of side ranging from 40 um to 60 um.

According to some embodiments of the present disclosure, the first thickness is 10 um and the second thickness is 5 um.

According to some embodiments of the present disclosure, a material of the piezoelectric sensing layer includes one or more copolymers of polyvinyl chloride, polycarbonate, polyvinylidene fluoride, polyvinylidene fluoride trifluoroethylene, polymethyl methacrylate, polytetrafluoroethylene.

According to some embodiments of the present disclosure, a material of the electrode layer includes aluminum.

According to some embodiments of the present disclosure, the ultrasonic fingerprint recognition module further includes an insulating layer on a side of the electrode layer distal to the base substrate.

In another aspect, the present disclosure provides a display device including the ultrasonic fingerprint recognition module described above and a display panel, and the ultrasonic fingerprint recognition module is located on a non-light-emitting side of the display panel.

In a further aspect, the present disclosure provides a method for fabricating an ultrasonic fingerprint recognition module, including:

providing a base substrate;

forming at least one ultrasonic wave signal transmitter and at least one ultrasonic wave signal receiver on the base substrate, wherein the at least one ultrasonic wave signal transmitter and the at least one ultrasonic wave signal receiver are disposed on a same side of the base substrate and spaced apart from each other in a first direction parallel to the base substrate;

forming a piezoelectric sensing layer on a side of the at least one ultrasonic wave signal transmitter and the at least one ultrasonic wave signal receiver distal to the base substrate; and forming an electrode layer on a side of the piezoelectric sensing layer distal to the base substrate.

According to some embodiments of the present disclosure, the piezoelectric sensing layer is formed to include a first portion having a first thickness and a second portion having a second thickness, the first thickness is greater than the second thickness, an orthographic projection of the ultrasonic wave signal transmitter on the base substrate at least partially overlaps an orthographic projection of the first portion on the base substrate, and an orthographic projection of the ultrasonic wave signal receiver on the base substrate at least partially overlaps an orthographic projection of the second portion on the base substrate.

According to some embodiments of the present disclosure, forming the piezoelectric sensing layer on the side of the at least one ultrasonic wave signal transmitter and the at least one ultrasonic wave signal receiver distal to the base substrate includes:

providing a transfer template, forming a piezoelectric sensing material layer on the transfer template and patterning the piezoelectric sensing material layer; and transferring the patterned piezoelectric sensing material layer to a side of the at least one ultrasonic wave signal transmitter and the at least one ultrasonic wave signal receiver distal to the base substrate to obtain the piezoelectric sensing layer.

According to some embodiments of the present disclosure, forming the piezoelectric sensing layer on the side of the at least one ultrasonic wave signal transmitter and the at least one ultrasonic wave signal receiver distal to the base substrate includes:

forming an amorphous piezoelectric polymer material layer on a side of the at least one ultrasonic wave signal transmitter and the at least one ultrasonic wave signal receiver distal to the base substrate;

pressing and patterning the amorphous piezoelectric polymer material layer; and crystallizing the amorphous piezoelectric polymer material layer after the pressing and patterning to obtain the piezoelectric sensing layer.

According to some embodiments of the present disclosure, the method for fabricating the ultrasonic fingerprint recognition module further includes forming an insulating layer on a side of the electrode layer distal to the base substrate.

BRIEF DESCRIPTION OF THE DRAWINGS

FIGS. **5*a* and 5*b* are diagrams illustrating a method for fabricating an ultrasonic fingerprint recognition module according to some embodiments of the present disclosure.

DETAILED DESCRIPTION

Figure 1:
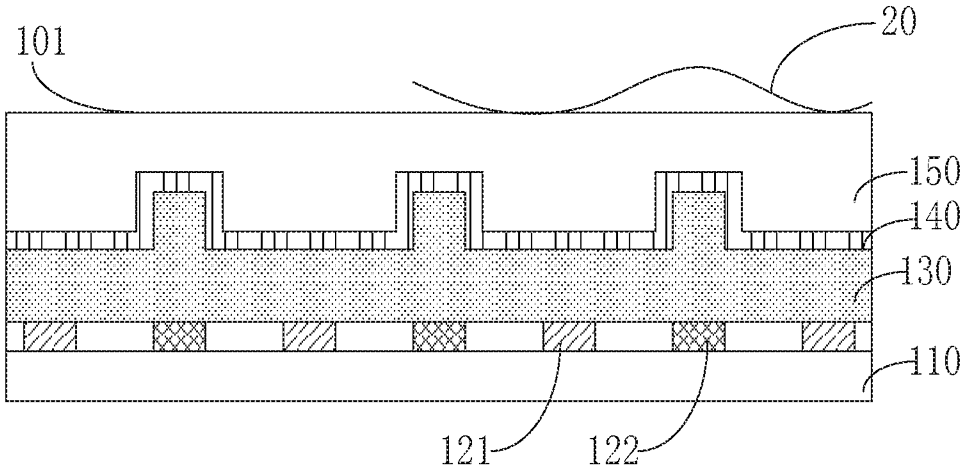
FIG. 1 is a cross-sectional view illustrating a structure of an ultrasonic fingerprint recognition module according to some embodiments of the present disclosure.

Generally, a voltage is applied to a piezoelectric material by an ultrasonic wave signal transmitter, and the piezoelectric material converts the electrical signal into an ultrasonic wave signal. When a finger presses a cover plate of an ultrasonic fingerprint recognition module, ridges of a fingerprint directly contacts the cover plate, and there is air, which has a large acoustic resistance, between valleys of the fingerprint and the cover plate. Therefore, when the ultrasonic wave signal is reflected by the surface of the finger, intensities of ultrasonic waves respectively reflected by the valley and the ridge are different. Then these ultrasonic waves act on the piezoelectric material, so that different voltage signals are generated at different positions of the piezoelectric material. Thereafter, the different voltage signals are output to an external circuit via an ultrasonic wave signal receiver and detected, and thus a fingerprint image can be recognized.

In order to make a person skilled in the art better understand the technical solutions of the present disclosure, an ultrasonic fingerprint recognition module and a fabricating method thereof according to the present disclosure are described in detail below in combination with the drawings. Details and functions that are not necessary for the present disclosure are omitted in the description to avoid confusion with the understanding of the present disclosure. In the present description, the following various embodiments for describing the principles of the present disclosure are merely illustrative and should not be interpreted as limiting scope of the disclosure. The following description with reference to the drawings is provided to facilitate a comprehensive understanding of the exemplary embodiments of the present disclosure defined by the claims and their equivalents. The following description includes various details to facilitate the understanding, but these details should be considered as merely exemplary. Accordingly, it will be appreciated by those skilled in the art that various changes and modifications may be made to the embodiments described herein without departing from the scope and spirit of the disclosure. In addition, descriptions regarding well-known functions and constructions are omitted for clarity and conciseness. In addition, throughout the drawings, identical reference numbers are used for identical or similar functions, devices and/or operations. In addition, in the drawings, portions are not necessarily drawn to scale. In other words, relative sizes, lengths, and the like of the respective portions in the drawings do not necessarily correspond to actual ratios.

In the present disclosure, the terms “include” and “comprise” and their derivatives mean to be inclusive and not to be limiting. The term “or” is inclusive, meaning “and/or”. In addition, in the following description of the present disclosure, the orientation terms, such as “upper”, “lower”, “left”, “right”, etc., are used to indicate relative positional relationships to assist those skilled in the art in understanding embodiments of the present disclosure and thus those skilled in the art should understand that “upper”/“lower” in one direction may become “lower”/“upper” in an opposite direction, and may become other positional relationships in the other directions, such as "left"/"right", etc.

FIG. 1 is a cross-sectional view illustrating a structure of an ultrasonic fingerprint recognition module according to some embodiments of the present disclosure. The ultrasonic fingerprint recognition module is used for acquiring a fingerprint recognition image of a finger 20 on a sensing surface 101, and the sensing surface 101 is a plane on which the finger 20 is placed when recognizing the fingerprint of the finger 20. As shown in FIG. 1, in some embodiments, the ultrasonic fingerprint recognition module includes: a base substrate 110, and at least one ultrasonic wave signal receiver 121 and at least one ultrasonic wave signal transmitter 122 disposed on a same side of the base substrate 110 and spaced apart from each other in a first direction X parallel to the base substrate 110. A piezoelectric sensing layer 130 is disposed on a side of the ultrasonic wave signal receiver 121 and the ultrasonic wave signal transmitter 122 distal to the base substrate 110. In some embodiments, in a direction perpendicular to the base substrate 110, the piezoelectric sensing layer 130 may include a first portion having a first thickness and a second portion having a second thickness smaller than the first thickness, and an orthographic projection of the ultrasonic wave signal transmitter 122 on the base substrate 110 at least partially overlaps an orthographic projection of the first portion on the base substrate 110, and an orthographic projection of the ultrasonic wave signal receiver 121 on the base substrate 110 at least partially overlaps an orthographic projection of the second portion on the base substrate 110. In some embodiments, the orthographic projection of the ultrasonic wave signal transmitter 122 on the base substrate 110 partially overlaps the orthographic projection of the first portion on the base substrate 110, and the orthographic projection of the ultrasonic wave signal receiver 121 on the base substrate 110 partially overlaps the orthographic projection of the second portion on the base substrate 110. In some embodiments, the orthographic projection of the ultrasonic wave signal transmitter 122 on the base substrate 110 completely overlaps the orthographic projection of the first portion on the base substrate 110, and the orthographic projection of the ultrasonic wave signal receiver 121 on the base substrate 110 completely overlaps the orthographic projection of the second portion on the base substrate 110. In some embodiments, the orthographic projection of the ultrasonic wave signal transmitter 122 on the base substrate 110 is located within the orthographic projection of the first portion on the base substrate 110, and the orthographic projection of the ultrasonic wave signal receiver 121 on the base substrate 110 is located within the orthographic projection of the second portion on the base substrate 110. An electrode layer 140 is disposed on a side of the piezoelectric sensing layer 130 distal to the base substrate 110. An insulating layer 150 is further disposed on a side of the electrode layer 140 distal to the base substrate 110, and the insulating layer 150 can be used for planarization and ensure mutual insulation of the electrode layer 140 from other structures thereon.

The ultrasonic fingerprint recognition module in the embodiment further includes a circuit board for electrically connecting the ultrasonic fingerprint recognition module and an external circuit. The ultrasonic wave signal transmitter includes a first thin film transistor circuit and a transmitting electrode electrically connected to each other, and the ultrasonic wave signal receiver includes a second thin film transistor circuit and a receiving electrode electrically connected to each other. When the ultrasonic fingerprint recognition module operates, the external circuit inputs a voltage signal to the first thin film transistor circuit of the ultrasonic wave signal transmitter 122 via the circuit board and causes a voltage difference between the transmitting electrode of the ultrasonic wave signal transmitter 122 and the electrode layer 140. A voltage signal indicating the voltage difference acts on a corresponding portion of the piezoelectric sensing layer 130 and excites the corresponding portion of the piezoelectric sensing layer 130 to emit ultrasonic waves upward, and then the ultrasonic waves are reflected when they arrive at the finger 20. Since there is more air at the fingerprint valley than at the fingerprint ridge of the finger 20 and the air has a large acoustic resistance, an intensity of the ultrasonic wave (i.e., intensity of ultrasonic wave signal) reflected from the fingerprint valley of the finger 20 is greater than an intensity of the ultrasonic wave reflected from the fingerprint ridge of the finger 20. Portions of the piezoelectric sensing layer 130 corresponding to the ultrasonic wave signal receivers 121 convert these ultrasonic wave signals into electrical signals having different magnitudes which are applied to the receiving electrodes of the ultrasonic wave signal receivers 121. The second thin film transistor circuit of the ultrasonic wave signal receiver 121 transmits these electrical signals having different magnitudes to an external circuit for sensing and further forming a fingerprint recognition image.

In the embodiment, since the ultrasonic wave signal receiver 121 and the ultrasonic wave signal transmitter 122 are located on a same side of the base substrate and spaced apart from each other in the first direction X parallel to the base substrate. Therefore, it is possible to eliminate a problem that one side of the base substrate is damaged in the case where both sides of the base substrate are in direct contact with a production line transmission channel during a production process, thereby improving a yield. In addition, generally in the related art, an ultrasonic wave signal transmitter and an ultrasonic wave signal transmitter are respectively disposed on two sides of a base substrate, and since a direction in which the ultrasonic wave signal transmitter emits the ultrasonic wave signal is perpendicular to the base substrate, the ultrasonic wave signal transmitter and the ultrasonic wave signal receiver are time-divisionally controlled to improve the signal-to-noise ratio, in order to avoid the case that the ultrasonic wave signal transmitted by the ultrasonic wave signal transmitter is directly received and sensed by the ultrasonic wave signal receiver without being reflected by the finger. The ultrasonic wave signal receiver 121 and the ultrasonic wave signal transmitter 122 according to the embodiment of the present disclosure are disposed on the same side of the base substrate and spaced apart from each other in the first direction X parallel to the base substrate, based on the structure above, which avoids the situation that the ultrasonic wave signal transmitted by the ultrasonic wave signal transmitter is directly received by the ultrasonic wave signal receiver without being reflected by the finger. Therefore, the time-division control for the ultrasonic wave signal transmitter and the ultrasonic wave signal receiver is not necessary, and then manufacturing difficulty and manufacturing cost are reduced.

In addition, since the ultrasonic wave signal transmitter needs a high voltage to excite the piezoelectric sensing layer to generate ultrasonic waves, in order to prevent the piezoelectric sensing layer from being broken down by the high voltage, the piezoelectric sensing layer 130 is provided to include a first portion having a first thickness and a second portion having a second thickness which is smaller than the first thickness, an orthographic projection of the ultrasonic wave signal transmitter 122 on the base substrate 110 at least partially overlaps an orthographic projection of the first portion on the base substrate 110, and an orthographic projection of the ultrasonic wave signal receiver 121 on the base substrate 110 at least partially overlaps an orthographic projection of the second portion on the base substrate 110. That is, the portion of the piezoelectric sensing layer 130 corresponding to the ultrasonic wave signal transmitter 122 is configured to be relatively thick. On the other hand, a thin piezoelectric sensing layer is more sensitive to ultrasonic waves, and is more advantageous for converting an ultrasonic wave signal into an electrical signal, so a portion of the piezoelectric sensing layer 130 corresponding to the ultrasonic wave signal receiver 121 is configured to be relatively thin. In summary, a thickness of the portion of the piezoelectric sensing layer 130 corresponding to the ultrasonic wave signal transmitter 122 in a direction perpendicular to the base substrate 110 is larger than a thickness of the portion of the piezoelectric sensing layer 130 corresponding to the ultrasonic wave signal receiver 121 in the direction perpendicular to the base substrate 110, which is advantageous for transmitting and receiving ultrasonic wave signals, and improving the recognition accuracy of fingerprint images. In some embodiments, the thickness of the portion of the piezoelectric sensing layer 130 corresponding to the ultrasonic wave signal transmitter 122 in the direction perpendicular to the base substrate 110, that is, the first thickness, is about 10 um, and the thickness of the portion of the piezoelectric sensing layer 130 corresponding to the ultrasonic wave signal receiver 121 in the direction perpendicular to the base substrate, that is, the second thickness, is about 5 um.

Figure 2:
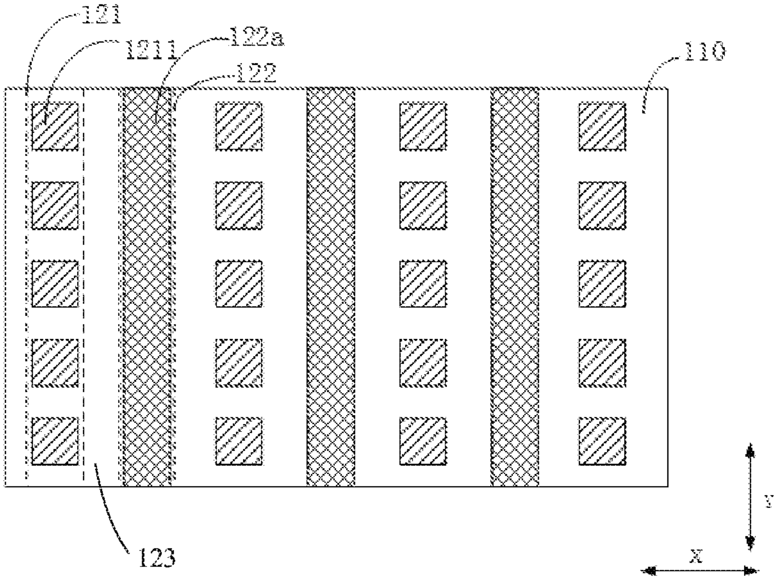
FIG. 2 is a plan view illustrating a structure of an ultrasonic fingerprint recognition module according to some embodiments of the present disclosure.

FIG. 2 is a plan view illustrating the structure of the ultrasonic fingerprint recognition module. As shown in FIGS. 1 and 2, in the embodiment, the ultrasonic wave signal receiver 121 includes a plurality of ultrasonic wave signal receiving blocks 1211 arranged in a second direction Y parallel to the base substrate and spaced apart from each other. The ultrasonic waves reflected by the finger 20 on the sensing surface 101 cause different portions of the piezoelectric sensing layer 130 to generate different electrical signals, and then the electrical signals are transmitted to the ultrasonic wave signal receiving block and output to the external circuit via the circuit board to form a fingerprint recognition image. In some embodiments, the first direction intersects with the second direction. In the embodiment, as an example, the first direction X is the horizontal direction in FIG. 2 and FIG. 3, and the second direction Y is the vertical direction in FIG. 2 and FIG. 3. Obviously, the first direction X and the second direction Y of the present disclosure are not limited thereto.

In some embodiments, the cross section of the ultrasonic wave signal receiving block 1211 parallel to the base substrate has a shape of rectangle with a length of side ranging from 40 um to 60 um. In some embodiments, the cross section of the ultrasonic wave signal receiving block 1211 has a size of 50 um×50 um. A width between a valley and a ridge adjacent thereto (i.e., width of a valley-ridge period) of the finger 20 is usually about 300 um, and thus, the ultrasonic wave signal receiving block 1211 is suitably configured in size so that one valley-ridge period of the finger 20 may correspond to a plurality of ultrasonic wave signal receiving blocks 1211 for sensing, which is advantageous for improving definition and accuracy of fingerprint recognition. As an example, the fingerprint recognition effect is excellent when the ultrasonic wave signal receiving block 1211 has a size of about 50 um×50 um.

In some embodiments, as shown in FIG. 2, each of the ultrasonic wave signal transmitters 122 may include one single ultrasonic wave signal emitting block 122*a* extending in the second direction Y and having an elongated shape. Since the voltage signal applied to the piezoelectric sensing layer 130 by each of the ultrasonic wave signal transmitters 122 is the same, process difficulty can be reduced by providing the ultrasonic wave signal transmitter 122*a* having an elongated shape and a plurality of ultrasonic wave signal receiving blocks 1211 arranged in the second direction Y. In one embodiment, wires electrically connecting the ultrasonic wave signal transmitter 122 and the ultrasonic wave signal receiver 121 to the circuit board may be arranged in an edge region of a backplate to bypass the ultrasonic wave signal transmitting block 122*a* with the elongated shape to avoid a short circuit. In another embodiment, an insulating layer 123 is provided between the ultrasonic wave signal transmitter 122 and the ultrasonic wave signal receiver 121, and wires electrically connecting the ultrasonic wave signal transmitter 122 to the circuit board may be arranged on a side of the insulating layer 123 distal to the ultrasonic wave signal transmitting block 122*a* with the elongated shape, and pass through a region where the ultrasonic wave signal transmitting block 122*a* is located, thereby realizing a narrow bezel.

Figure 3:
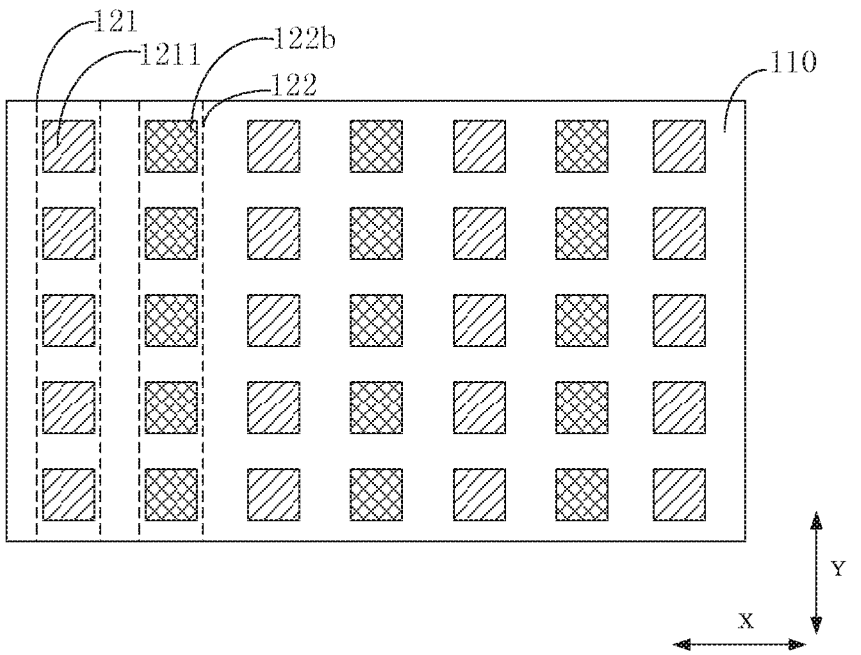
FIG. 3 is a plan view illustrating a structure of an ultrasonic fingerprint recognition module according to some embodiments of the present disclosure.

In some embodiments, as shown in FIG. 3, each of the ultrasonic wave signal transmitters 122 may include a plurality of ultrasonic wave signal transmitting blocks 122*b* arranged in the second direction Y and spaced apart from each other. As compared with the ultrasonic wave signal transmitting block 122*a* with the elongated shape, the plurality of ultrasonic wave signal transmitting blocks 122*b* arranged in the second direction Y and spaced apart from each other provide more space in a central region of the backplate for arranging the wires electrically connecting the ultrasonic wave signal transmitter 122 and the ultrasonic wave signal receiver 121 to the circuit board. As such, it is not necessary to arrange all the wires in the edge region of the backplate to bypass the ultrasonic wave signal transmitting block with the elongated shape, and thus a narrow bezel can be achieved. In addition, in this embodiment, a contact region of the finger 20 may be first determined based on sensed changes in electrical signals, and then only the ultrasonic wave signal transmitting blocks 122*b* and the ultrasonic wave signal receiving block 1211 corresponding to the contact region are controlled to operate so as to collect fingerprint image signals. In this way, power consumption is decreased.

In some embodiments, the cross section of the ultrasonic wave signal transmitting blocks 122*b* parallel to the base substrate has a shape of rectangle with a length of side ranging from 40 um to 60 um. In some embodiments, the cross section of the ultrasonic wave signal transmitting block 122*b* has a dimension of 50 um×50 um.

In addition, since the ultrasonic wave signal transmitter 122 needs a high voltage to excite the piezoelectric sensing layer 130 to generate ultrasonic waves, in order to prevent a switching transistor of the first thin film transistor circuit in the ultrasonic wave signal transmitter 122 from being broken down by the high voltage, the switching transistor needs to be specially manufactured.

In some embodiments, a material of the piezoelectric sensing layer 130 may be selected from, but is not limited to, one or a combination of multiple of copolymers such as polyvinyl chloride, polycarbonate, polyvinylidene fluoride (PVDF), polyvinylidene fluoride trifluoroethylene (PVDF- TrFE), polymethyl methacrylate (PMMA), polytetrafluoroethylene (TEFLON), and the like.

In some embodiments, the material of the electrode layer 140 includes aluminum.

In the ultrasonic fingerprint recognition module according to the embodiment, since the ultrasonic wave signal receiver and the ultrasonic wave signal transmitter are located on the same side of the base substrate and spaced apart from each other in the first direction parallel to the base substrate, it is possible to eliminate a problem that one side of the base substrate is damaged in the case where both sides of the base substrate are in direct contact with a production line transmission channel during a production process, thereby improving a yield, and since the time-divisional control is not necessary, manufacturing difficulty and manufacturing cost are reduced. In addition, the thickness of the portion of the piezoelectric sensing layer corresponding to the ultrasonic wave signal transmitter in a direction perpendicular to the base substrate is larger than the thickness of the portion of the piezoelectric sensing layer corresponding to the ultrasonic wave signal receiver in the direction perpendicular to the base substrate, which is advantageous for transmitting and receiving fingerprint recognition signals, and improving the recognition accuracy of fingerprint images.

In another aspect, an embodiment of the present disclosure provides a display device including a display panel and an ultrasonic fingerprint recognition module. The ultrasonic fingerprint recognition module is disposed on a non-light-emitting side of the display panel. The display panel may include a liquid crystal display panel or an organic light emitting diode display panel. The ultrasonic fingerprint recognition module may be an ultrasonic fingerprint recognition module according to the embodiment of the present disclosure. For description regarding the ultrasonic fingerprint recognition module, the above embodiments may be referred to and the details thereof are omitted herein.

In the display device according to the embodiment, since the ultrasonic wave signal receiver and the ultrasonic wave signal transmitter are located on the same side of the base substrate and spaced apart from each other in the first direction parallel to the base substrate, it is possible to eliminate a problem that one side of the base substrate is damaged in the case where both sides of the base substrate are in direct contact with a production line transmission channel during a production process, thereby improving a yield, and since the time-divisional control is not necessary, difficulty and cost in manufacturing process are decreased. In addition, the thickness of the portion of the piezoelectric sensing layer corresponding to the ultrasonic wave signal transmitter in a direction perpendicular to the base substrate is larger than the thickness of the portion of the piezoelectric sensing layer corresponding to the ultrasonic wave signal receiver in the direction perpendicular to the base substrate, which is advantageous for transmitting and receiving fingerprint recognition signals, and improving the recognition accuracy of fingerprint images.

Figure 4:
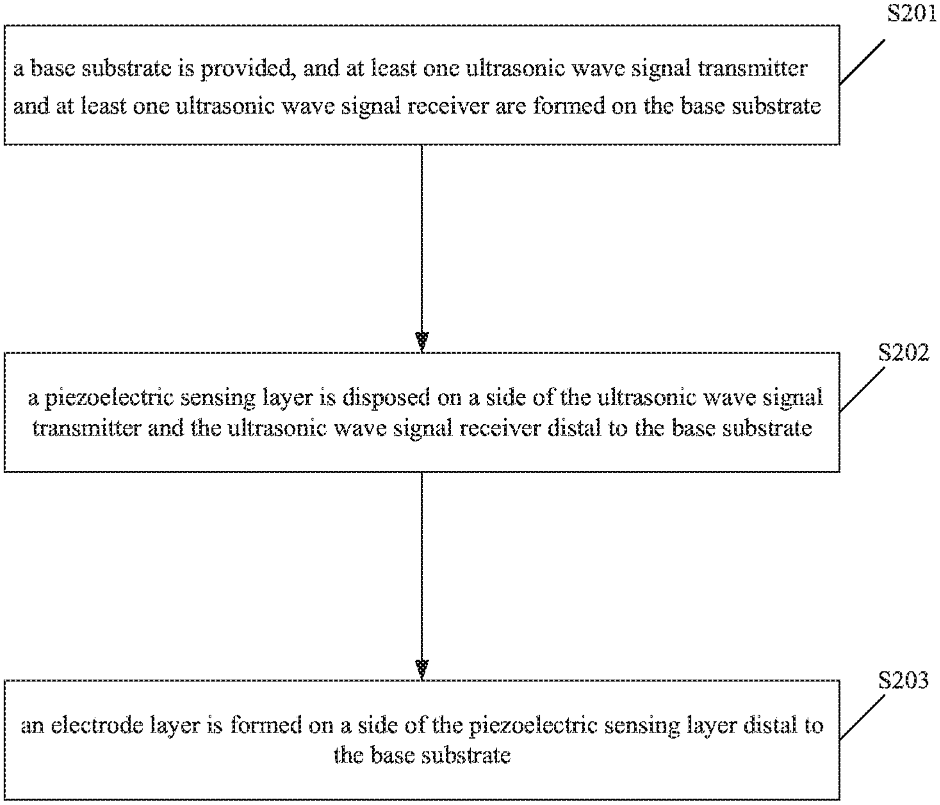
FIG. 4 is a flow chart illustrating a method for fabricating an ultrasonic fingerprint recognition module according to some embodiments of the present disclosure.

FIG. 4 is a flow chart illustrating a method for fabricating an ultrasonic fingerprint recognition module according to some embodiments of the present disclosure. As shown in FIG. 4, the fabricating method is used to fabricate the ultrasonic fingerprint recognition module according to some embodiments of the present disclosure, and the fabricating method includes the following steps S201 to S203.

At step S201, a base substrate is provided, and at least one ultrasonic wave signal transmitter and at least one ultrasonic wave signal receiver are formed on the base substrate.

In an embodiment, the ultrasonic wave signal receiver and the ultrasonic wave signal transmitter are located on a same side of the base substrate and spaced apart from each other in a first direction parallel to the base substrate, and an orthographic projection of the ultrasonic wave signal transmitter on the base substrate does not overlap an orthographic projection of the ultrasonic wave signal receiver on the base substrate.

At step S202, a piezoelectric sensing layer is disposed on a side of the ultrasonic wave signal transmitter and the ultrasonic wave signal receiver distal to the base substrate. The thickness of the portion of the piezoelectric sensing layer corresponding to the ultrasonic wave signal transmitter in a direction perpendicular to the base substrate is larger than the thickness of the portion of the piezoelectric sensing layer corresponding to the ultrasonic wave signal receiver in the direction perpendicular to the base substrate.

At step S203, an electrode layer is formed on a side of the piezoelectric sensing layer distal to the base substrate.

Figure 5A:
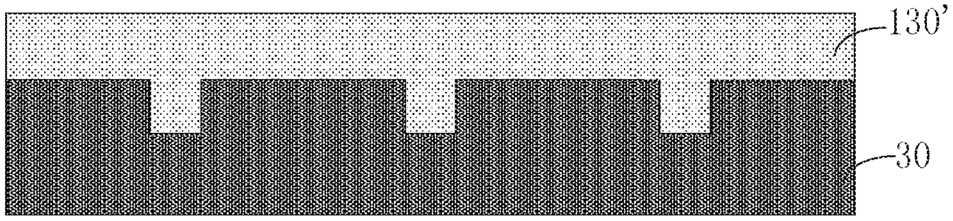
Figure 5B:
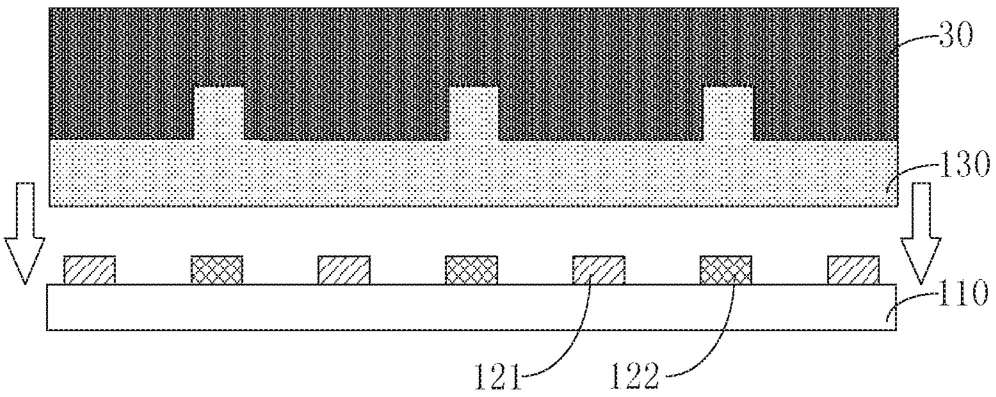

In an embodiment, step S202 includes forming the piezoelectric sensing layer on the ultrasonic wave signal transmitter and the ultrasonic wave signal receiver by a transfer process. In an embodiment, as shown in FIG. 5*a*, a piezoelectric sensing material layer is first formed on a specially prepared transfer template 30 with a corresponding pattern and the piezoelectric sensing material layer is patterned and then accurately aligned. As shown in FIG. 5*b*, a patterned piezoelectric sensing material layer 130' is transferred onto the base substrate 110 provided with the ultrasonic wave signal transmitter 122 and the ultrasonic wave signal receiver 121 to form the piezoelectric sensing layer 130, such that the thickness of the portion of the piezoelectric sensing layer 130 corresponding to the ultrasonic wave signal transmitter 122 in a direction perpendicular to the base substrate is larger than the thickness of the portion of the piezoelectric sensing layer 130 corresponding to the ultrasonic wave signal receiver 121 in the direction perpendicular to the base substrate. Then the preparation of the piezoelectric sensing layer 130 is finished.

Figure 6A:
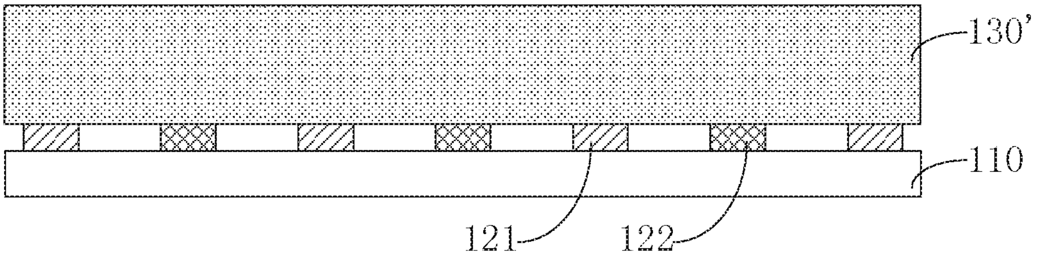
FIGS. 6*a* and 6*b*** are diagrams illustrating a method for fabricating an ultrasonic fingerprint recognition module, according to some embodiments of the present disclosure.
Figure 6B:
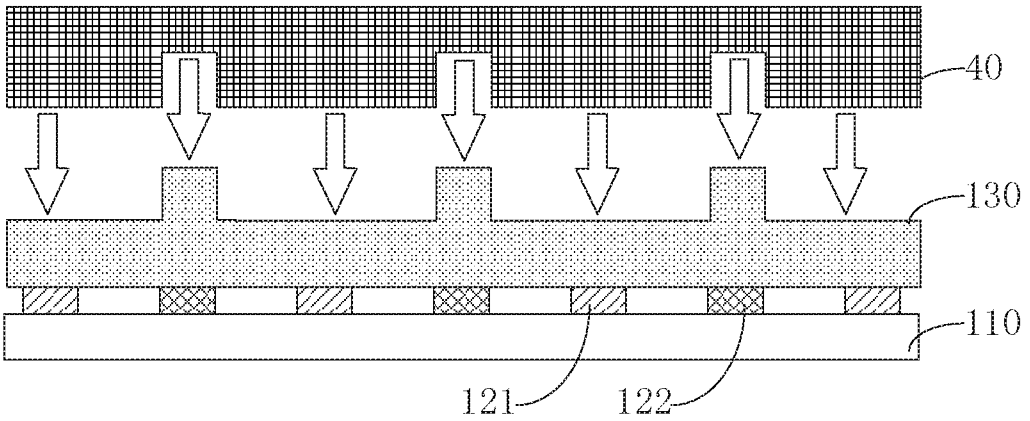

Alternatively, the piezoelectric sensing layer may be formed on the ultrasonic wave signal transmitter and the ultrasonic wave signal receiver by a pressing and patterning method. In an embodiment, as shown in FIG. 6*a*, an amorphous piezoelectric polymer material layer 130' is first provided on a side of the ultrasonic wave signal transmitter 122 and the ultrasonic wave signal receiver 121 distal to the base substrate 110, and the amorphous piezoelectric polymer material layer is in a highly elastic state. The piezoelectric polymer material layer 130' is then pressed and patterned with a specially-prepared pattern die 40 having a corresponding pattern after accurate alignment, as shown in FIG. 6*b*. Finally, the patterned piezoelectric polymer material layer 130' is crystallized to obtain a piezoelectric sensing layer 130, such that a thickness of a portion of the piezoelectric sensing layer 130 corresponding to the ultrasonic wave signal transmitter 122 in a direction perpendicular to the base substrate is larger than a thickness of a portion of the piezoelectric sensing layer 130 corresponding to the ultrasonic wave signal receiver 121 in the direction perpendicular to the base substrate. Thereby, the preparation of the piezoelectric sensing layer 130 is finished. It should be noted that in order to prevent portions having different thicknesses of the piezoelectric sensing layer from having different densities and to prevent damage to the ultrasonic wave signal transmitter 122 and the ultrasonic wave signal receiver 121 therebelow after the pressing and patterning process, the crystallization process need to be performed after the pressing and patterning process. The piezoelectric polymer material layer 130' is kept in the amorphous state during the pressing and patterning process.

The method for fabricating the ultrasonic fingerprint recognition module according to the embodiment can be used to implement the ultrasonic fingerprint recognition module according to the embodiment of the present disclosure. For the detailed description of the ultrasonic fingerprint recognition module, reference may be made to the foregoing embodiments, and details thereof are not described herein again.

In the ultrasonic fingerprint recognition module prepared by the method for fabricating the ultrasonic fingerprint recognition module according to the embodiment, since the ultrasonic wave signal receiver and the ultrasonic wave signal transmitter are located on the same side of the base substrate and spaced apart from each other in the first direction parallel to the base substrate, it is possible to eliminate a problem that one side of the base substrate is damaged in the case where both sides of the base substrate are in direct contact with a production line transmission channel during a production process, thereby improving a yield, and since the time-divisional control is not necessary, manufacturing difficulty and manufacturing cost are reduced. In addition, the thickness of the portion of the piezoelectric sensing layer corresponding to the ultrasonic wave signal transmitter in a direction perpendicular to the base substrate is larger than the thickness of the portion of the piezoelectric sensing layer corresponding to the ultrasonic wave signal receiver in the direction perpendicular to the base substrate, which is advantageous for transmitting and receiving fingerprint recognition signals, and improving the recognition accuracy of fingerprint images.

It is to be understood that the above embodiments are merely exemplary embodiments adopted to explain the principles of the present disclosure, and the present disclosure is not limited thereto. Various modifications and improvements can be made by those skilled in the art without departing from the spirit and scope of the disclosure, and such modifications and improvements are also considered to be within the scope of the disclosure.

What is claimed is:

1. An ultrasonic fingerprint recognition module, comprising:

a base substrate;

at least one ultrasonic wave signal transmitter and at least one ultrasonic wave signal receiver on the base substrate, wherein the at least one ultrasonic wave signal transmitter and the at least one ultrasonic wave signal receiver are on a same side of the base substrate and spaced apart from each other in a first direction parallel to the base substrate;

a piezoelectric sensing layer on a side of the at least one ultrasonic wave signal transmitter and the at least one ultrasonic wave signal receiver distal to the base substrate; and an electrode layer on a side of the piezoelectric sensing layer distal to the base substrate.

2. The ultrasonic fingerprint recognition module of claim 1, wherein the piezoelectric sensing layer comprises a first portion having a first thickness and a second portion having a second thickness, the first thickness is greater than the second thickness, an orthographic projection of the ultrasonic wave signal transmitter on the base substrate at least partially overlaps an orthographic projection of the first portion on the base substrate, and an orthographic projection of the ultrasonic wave signal receiver on the base substrate at least partially overlaps an orthographic projection of the second portion on the base substrate.

3. The ultrasonic fingerprint recognition module of claim 1, wherein the ultrasonic wave signal receiver comprises a plurality of ultrasonic wave signal receiving blocks arranged in a second direction parallel to the base substrate and spaced apart from each other, and the first direction intersects with the second direction.

4. The ultrasonic fingerprint recognition module of claim 3, wherein the ultrasonic wave signal transmitter comprises an ultrasonic wave signal transmitting block extending in the second direction and having an elongated shape.

5. The ultrasonic fingerprint recognition module of claim 3, wherein the ultrasonic wave signal transmitter comprises a plurality of ultrasonic wave signal transmitting blocks arranged in the second direction and spaced apart from each other.

6. The ultrasonic fingerprint recognition module of claim 4, further comprising an insulating layer between the ultrasonic wave signal transmitter and the ultrasonic wave signal receiver.

7. The ultrasonic fingerprint recognition module of claim 1, wherein the ultrasonic wave signal transmitter comprises a transmitting electrode and is configured to apply a voltage provided by an external circuit to the transmitting electrode such that the piezoelectric sensing layer is excited by a voltage between the transmitting electrode and the electrode layer to generate ultrasonic waves; and the ultrasonic wave signal receiver comprises a receiving electrode configured to receive an electrical signal into which reflected ultrasonic waves are converted by the piezoelectric sensing layer, and the ultrasonic wave signal receiver is configured to transmit the electrical signal received by the receiving electrode to the external circuit for sensing.

8. The ultrasonic fingerprint recognition module of claim 3, wherein a cross section of the ultrasonic wave signal receiving block parallel to the base substrate has a shape of rectangle with a length of side ranging from 40 um to 60 um.

9. The ultrasonic fingerprint recognition module of claim 5, wherein a cross section of the ultrasonic wave signal transmitting block parallel to the base substrate has a shape of rectangle with a length of side ranging from 40 um to 60 um.

10. The ultrasonic fingerprint recognition module of claim 2, wherein the first thickness is 10 um and the second thickness is 5 um.

11. The ultrasonic fingerprint recognition module of claim 1, wherein a material of the piezoelectric sensing layer comprises one or more copolymers of polyvinyl chloride, polycarbonate, polyvinylidene fluoride, polyvinylidene fluoride trifluoroethylene, polymethyl methacrylate, and polytetrafluoroethylene.

12. The ultrasonic fingerprint recognition module of claim 1, wherein a material of the electrode layer comprises aluminum.

13. The ultrasonic fingerprint recognition module of claim 1, further comprising an insulating layer on a side of the electrode layer distal to the base substrate.

14. A display device comprising the ultrasonic fingerprint recognition module of claim 1 and a display panel, wherein the ultrasonic fingerprint recognition module is on a non-light-emitting side of the display panel.

15. A method for fabricating an ultrasonic fingerprint recognition module, comprising:

providing a base substrate;

forming at least one ultrasonic wave signal transmitter and at least one ultrasonic wave signal receiver on the base substrate, wherein the at least one ultrasonic wave signal transmitter and the at least one ultrasonic wave signal receiver are on a same side of the base substrate and spaced apart from each other in a first direction parallel to the base substrate;

forming a piezoelectric sensing layer on a side of the at least one ultrasonic wave signal transmitter and the at least one ultrasonic wave signal receiver distal to the base substrate; and forming an electrode layer on a side of the piezoelectric sensing layer distal to the base substrate.

16. The method of claim 15, wherein the piezoelectric sensing layer is formed to comprise a first portion having a first thickness and a second portion having a second thickness, the first thickness is greater than the second thickness, an orthographic projection of the ultrasonic wave signal transmitter on the base substrate at least partially overlaps an orthographic projection of the first portion on the base substrate, and an orthographic projection of the ultrasonic wave signal receiver on the base substrate at least partially overlaps an orthographic projection of the second portion on the base substrate.

17. The method of claim 15, wherein forming the piezoelectric sensing layer on the side of the at least one ultrasonic wave signal transmitter and the at least one ultrasonic wave signal receiver distal to the base substrate comprises:

providing a transfer template, forming a piezoelectric sensing material layer on the transfer template and patterning the piezoelectric sensing material layer; and transferring the patterned piezoelectric sensing material layer to a side of the at least one ultrasonic wave signal transmitter and the at least one ultrasonic wave signal receiver distal to the base substrate to obtain the piezoelectric sensing layer.

18. The method of claim 15, wherein forming the piezoelectric sensing layer on the side of the at least one ultrasonic wave signal transmitter and the at least one ultrasonic wave signal receiver distal to the base substrate comprises:

forming an amorphous piezoelectric polymer material layer on a side of the at least one ultrasonic wave signal transmitter and the at least one ultrasonic wave signal receiver distal to the base substrate;

pressing and patterning the amorphous piezoelectric polymer material layer; and crystallizing the amorphous piezoelectric polymer material layer after the pressing and patterning to obtain the piezoelectric sensing layer.

19. The method of claim 15, further comprising forming an insulating layer on a side of the electrode layer distal to the base substrate.

* * * * *